United States Patent [19]

Richards

[11] Patent Number: 4,736,643
[45] Date of Patent: Apr. 12, 1988

[54] BLOCKED JAW CLUTCH ASSEMBLY

[75] Inventor: Elmer A. Richards, Kalamazoo, Mich.

[73] Assignee: Eaton Corporation, Cleveland, Ohio

[21] Appl. No.: 837,106

[22] Filed: Mar. 7, 1986

[51] Int. Cl.⁴ .................. F16H 3/38; F16H 3/08
[52] U.S. Cl. ......................... 74/339; 74/331; 192/53 F
[58] Field of Search ............... 74/745, 339, 331, 360; 192/53 F, 53 E

[56] References Cited

U.S. PATENT DOCUMENTS

| 3,799,002 | 3/1974 | Richards | 74/745 |
|---|---|---|---|
| 3,921,469 | 11/1975 | Richards | 74/339 |
| 3,924,484 | 12/1975 | Richards | 74/331 |
| 3,983,979 | 10/1976 | Richards | 192/53 F |
| 4,132,122 | 1/1979 | Richards | 74/339 |
| 4,192,196 | 3/1980 | Bogemia et al. | 74/339 |
| 4,194,410 | 3/1980 | Richards | 74/339 |
| 4,375,172 | 3/1983 | Richards et al. | 74/331 X |
| 4,440,037 | 4/1984 | Foxton et al. | 74/331 |
| 4,527,447 | 7/1985 | Richards | 74/866 |

FOREIGN PATENT DOCUMENTS

| 117342 | 5/1984 | European Pat. Off. |  |
| 2758394 | 12/1978 | Fed. Rep. of Germany | 74/339 |
| 2854747 | 6/1979 | Fed. Rep. of Germany | 74/339 |

Primary Examiner—Dirk Wright
Attorney, Agent, or Firm—D. A. Rowe; H. D. Gordon

[57] ABSTRACT

A blocked jaw clutch assembly (156) having a second positive stop member (200,202) to limit axial movement of a second jaw clutch member (116) away from the first stop member (134) is provided. During initiation of a shifting operation, if the first (164) and second (116) jaw clutch members are not at substantially synchronous rotation, the second stop member will limit axial movement of said first jaw clutch member (108, 164) to a preselect position (FIG. 9B) axially intermediate the neutral axial position (FIG. 9A) and fully engaged axial position (FIG. 9C) thereof.

20 Claims, 6 Drawing Sheets

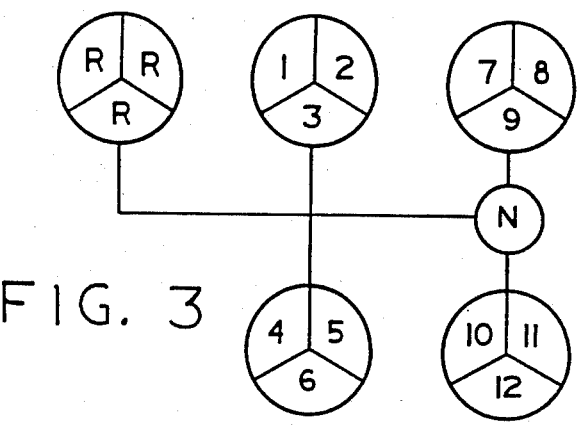
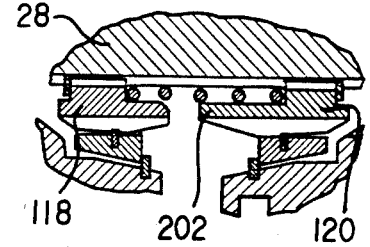
FIG. 3
FIG. 2A
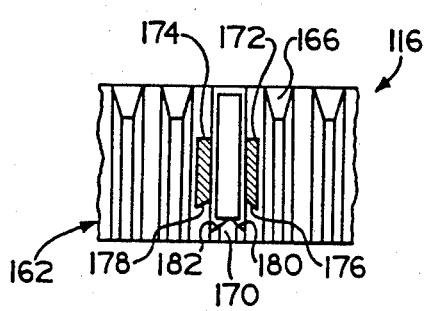
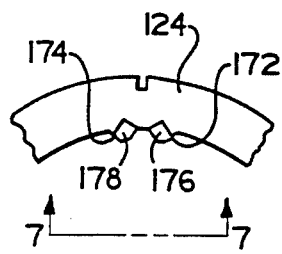
FIG. 5
FIG. 6
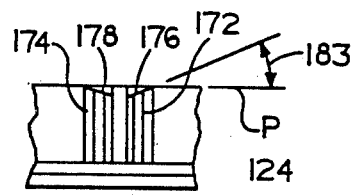
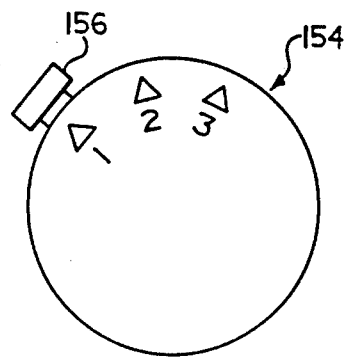
FIG. 7
FIG. 8

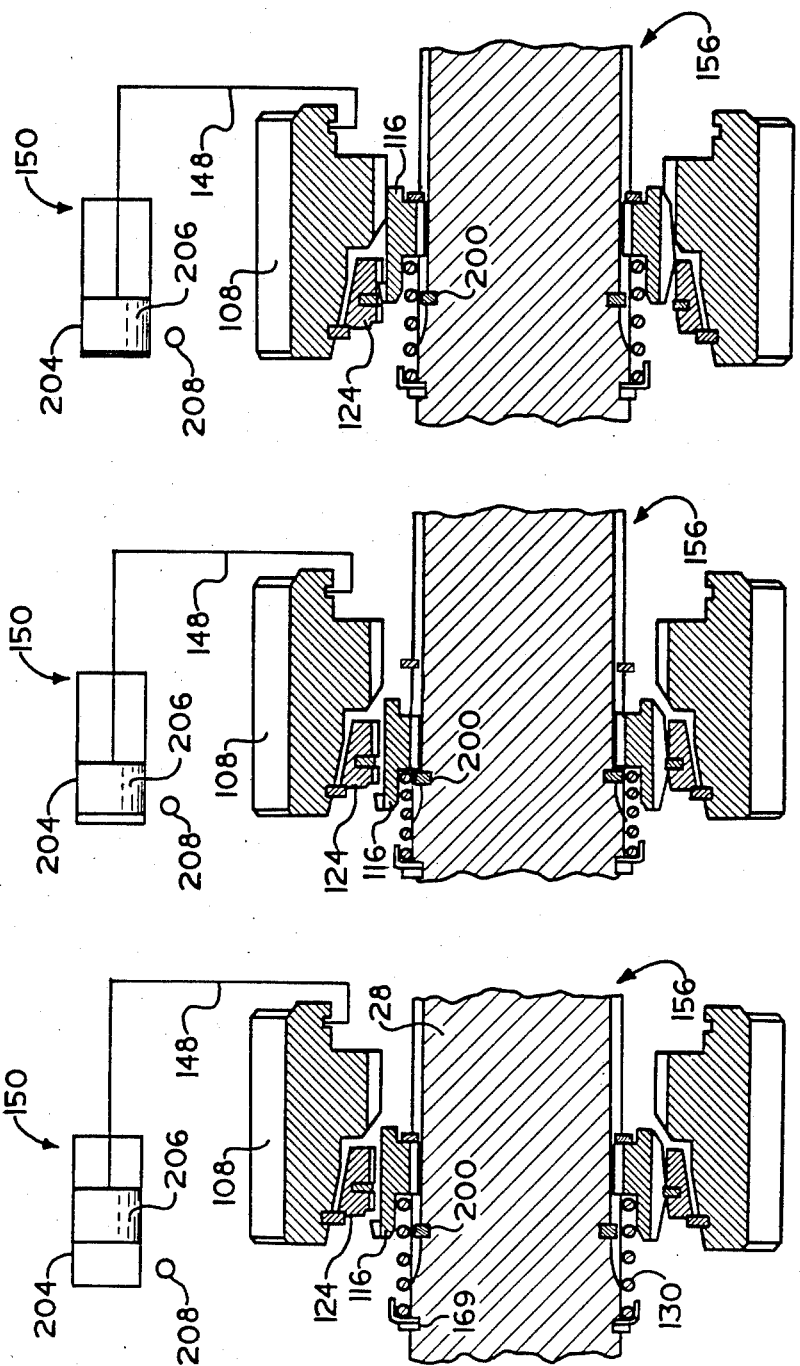

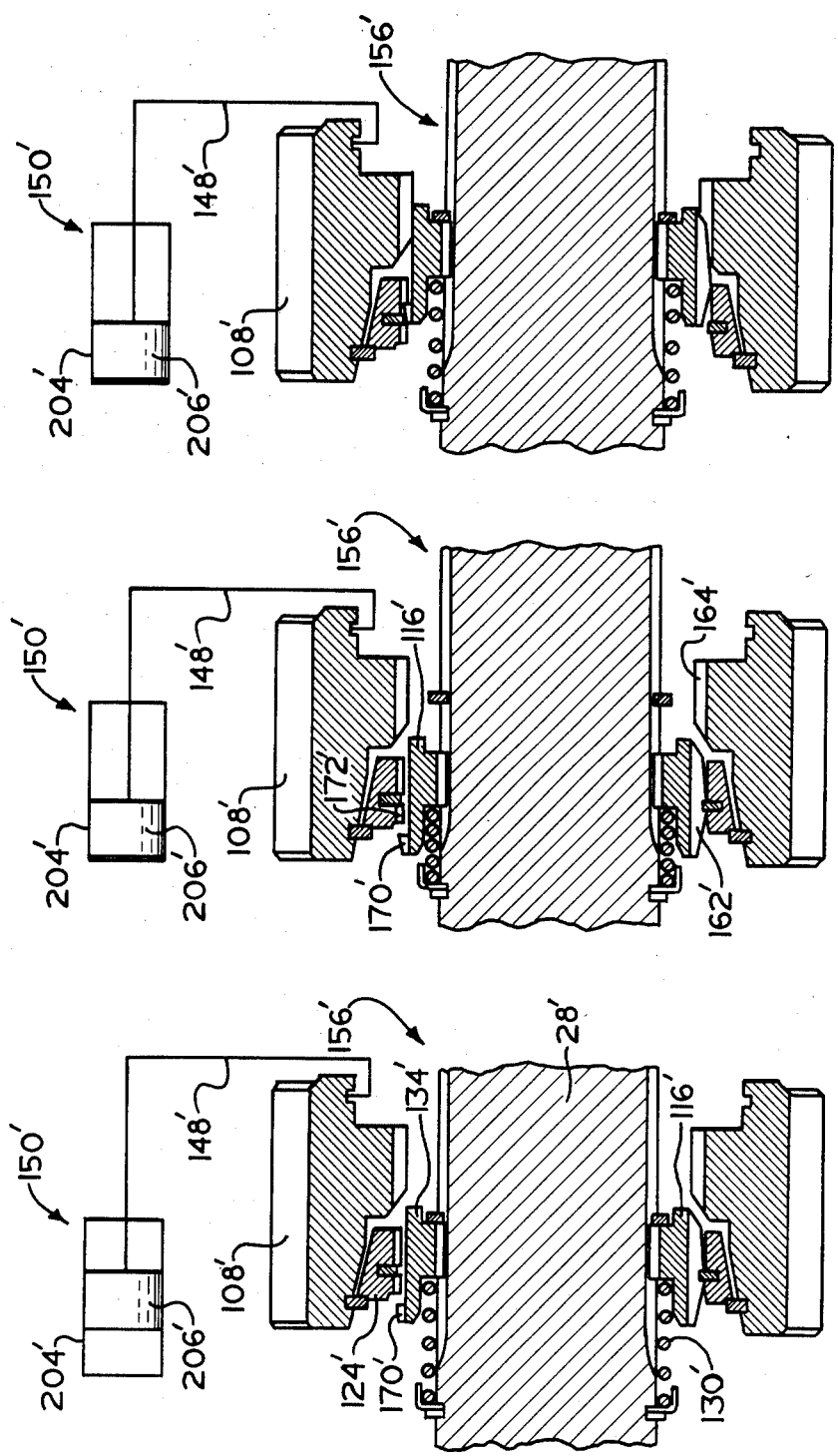

BLOCKED JAW CLUTCH ASSEMBLY

BACKGROUND OF THE INVENTION

1. Field of the Invention

This invention relates to blocked jaw clutch assemblies and in particular to improved blocked jaw clutch assemblies for use in compound change gear transmissions wherein the main section utilizes manually engaged nonsynchronized, unblocked jaw clutches to selectively engage a selected main section ratio gear and wherein the auxiliary section utilizes blocked resiliently shifted jaw clutches to selectively engage a selected auxiliary ratio. Preferably, the blockers and associated clutch members in the auxiliary section have complementary ramps on the blocking members thereof configured to prevent nonsynchronized engagement of the associated jaw clutch members when the main section is engaged but which will tend to act as positioners to place the blocker and clutch member in a nonblocking condition when the main section is in a neutral or disengaged condition.

2. Description of the Prior Art

Compound transmissions of the splitter or range type, or a combination thereof, are well known in the prior art as may be seen by reference to U.S. Pat. Nos. 3,105,395; 3,648,546; 3,799,002; 2,932,988 and 3,229,551, the disclosures of which are all hereby incorporated by reference.

Blocked change gear transmissions of both the single and the compound types are also well known in the prior art as may be seen by reference to U.S. Pat. Nos. 3,799,002; 3,921,469; 3,924,484; 3,983,979; 4,132,122; 4,192,196 and 4,194,410, the disclosures of which are all hereby incorporated by reference.

Semi-blocked compound change gear transmissions wherein the main section utilizes manually engaged nonsynchronized, unblocked jaw clutches to selectively engage a selected main section ratio gear and wherein the auxiliary section utilizes blocked resiliently shifted jaw clutches to selectively engage a selected auxiliary ratio, and wherein the blockers and associated clutch members in the auxiliary section have complementary ramps, also called "sensor unblocker ramps", on the blocking members thereof configured to prevent nonsynchronized engagement of the associated jaw clutch members when the main section is engaged but which will tend to act as positioners to place the blocker and clutch member in a nonblocking condition when the main section is in a neutral or disengaged condition are known in the prior art as may be seen by reference to U.S. Pat. No. 4,440,037 and European Publication No. 0 071 353, published Feb. 9, 1983, of allowed European Patent Application No. 82 303 585.2 (corresponding to applicant's assignee's U.S. patent application Ser. No. 287,470, filed July 27, 1981), the disclosures of which are hereby incorporated by reference.

Automated and/or semi-automated blocked or semi-blocked change gear transmissions are known in the prior art as may be seen by reference to U.S. Pat. No. 4,527,447, the disclosure of which is hereby incorporated by reference.

The prior art semi-blocked compound transmissions, especially the splitter type, wherein the main transmission section is provided with well known nonsynchronized, unblocked jaw clutch assemblies, and the auxiliary transmission section is provided with resiliently shiftable blocked jaw clutch assemblies and, preferably, the blocked jaw clutch assemblies are provided with complimentary ramp members on the associated blocker and clutch members which will cause the blockers to prevent nonsynchronous engagement of the associated jaw clutch assemblies when the main transmission section is engaged but will allow the blocker to tend to rotationally move to a nonblocking position under the influence of a spring bias, when the main transmission section is in neutral, provides a relatively uncomplicated and reliable compound transmission which is shiftable with substantially the ease of a simple transmission and allows shifts to be completed with the vehicle in a static condition.

However, such transmissions, and the blocked jaw clutch assemblies utilized therewith, have been less than totally satisfactory in certain situations requiring increased unblocking force and/or an accurate signal, such as for automation purposes, of gear engagement derived solely from actuator position as the amount of axial force urging the complimentary ramped surfaces of the blockers into contact is limited to spring force and/or monitoring of the actuator piston position did not provide an accurate indication of gear engagement. Both drawbacks result from the structure and operation of the prior art blocked clutch assemblies wherein the actuator piston is moved to its fully displaced actuated position when moving the clutch members and biasing spring to the pre-select position.

SUMMARY OF THE INVENTION

In accordance with the present invention, the drawbacks of the prior art have been overcome or minimized by the provision of an improved blocked clutch assembly wherein the actuator assumes a position intermediate the fully displaced and non-displaced positions thereof when the clutch members and blocker are in the pre-select position. The above is accomplished by providing a stop member or the like which is utilized to positively limit axial movement of the blocked clutch members, and the actuator mechanism, in a position intermediate the nondisplaced and fully displaced positions thereof. As the clutch mechanism unblocks and the clutch members axially engage, the actuator member, and the clutch member axially fixed thereto, is free to move to the fully displaced positions thereof. Accordingly, movement of the actuator to the fully displaced position thereof is an accurate signal of clutch engagement, not merely of pre-select or engagement. Further, in the stopped pre-select position, the axial engagement force on the ramps is the total force applied by the actuator, if any, and the spring, not merely the force applied by the spring only.

Accordingly, it is an object of the present invention to provide an improved blocked jaw clutch assembly.

This and other objects and advantages of the present invention will become apparent from a reading of the detailed description of the preferred embodiment taken in view of the accompanying drawings.

DESCRIPTION OF THE DRAWINGS

FIG. 2A is a partial sectional view of an alternate embodiment of the present invention FIG. 3 is a schematic illustration of the shift pattern of the transmission of FIG. 1

FIG. 5 shows the components of the blocker and jaw clutch fragmentarily in synchronous condition permitting shifting.

FIG. 6 is a fragmentary view of the blocker of FIG. 4.

FIG. 7 is a view taken in the direction of the arrows 7—7 in FIG. 6.

FIG. 8 is a top view of the shift lever knob and master the control of transmission of FIG. 1.

FIG 9A, 9B and 9C, respectively, illustrate the blocked jaw clutch assembly of the present invention in the neutral, preselect and gear engagement positions thereof.

FIGS. 10A, 10B and 10C, respectively, illustrate a typical prior art blocked jaw clutch assembly in the neutral, preselect and gear engagement positions thereof.

DESCRIPTION OF THE PREFERRED EMBODIMENT

Referring now to the apparatus in detail, it will be recognized that a detailed disclosure of both the construction and operation of blockers and blocked or semi-transmissions utilizing same has been set forth and claimed in the above mentioned patents and reference is therefore made thereto for such details.

Figure 1:
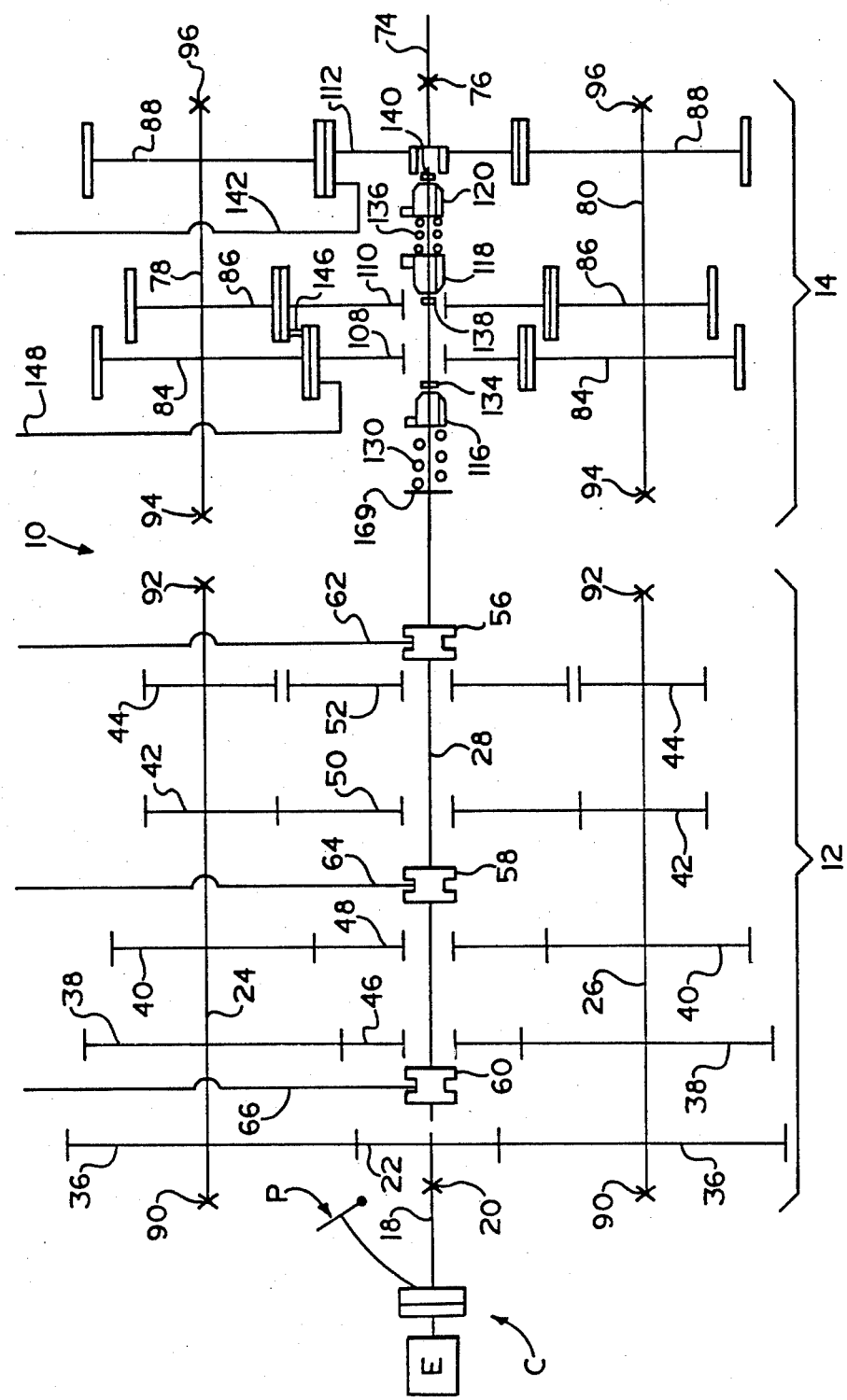
FIG. 1 is a schematic illustration of a "4×3" twelve speed version of semi-blocked transmission wr which the improved blocked jaw clutch assembly of the present invention is advantageously utilized.

Certain terminology will be used in the following description for convenience in reference only and will not be limiting. The words "upwardly", "downwardly", "rightwardly" and "leftwardly" will designate directions in the drawings to which reference is made. The words "forward" and "rearward" will refer respectively to the front and rear ends of the transmission as same is conventionally mounted in the vehicle, being respectively the left and right sides of the transmission as illustrated in FIG. 1. The words "inwardly" and "outwardly" will refer to directions toward and away from, respectively, the geometric center of the device and designated part thereof. Said terminology will include the words above specifically mentioned, derivatives thereof and words of similar import.

The term "compound transmission" is used to designate a transmission having a main transmission portion and an auxiliary transmission portion connected in series whereby the selected gear reduction in the main transmission portion may be compounded by further selected gear reduction in the auxiliary transmission port. The term "splitter type compound transmission" as used herein will designate a compound transmission wherein the auxiliary transmission is used to provide various selectable steps or subdivisions of the gear ratio selected in the main transmission port. In a splitter type compound transmission, the main transmission section is typically provided with relatively wide steps which are split or subdivided by the auxiliary section.

The term "blocked transmission" or "blocked transmission section" shall designate a change gear transmission or transmission section wherein a selected gear is nonrotatably coupled to a shaft by means of a positive clutch and a blocker is utilized to prevent such engagement until the members of the positive clutch are substantially synchronous, such synchronous condition achieved by manual and/or automatic manipulation of the transmission input and/or output shafts to cause a crossing of syncronous condition therebetween but not achieved by frictional contact of the selected clutch members sufficient to cause one of the clutch members, and the apparatus associated therewith, to rotate with the other clutch member.

The term "synchronized transmission" shall designate a change gear transmission wherein a selected gear is non-rotatably coupled to a shaft by means of a positive clutch, attempted engagement of said clutch is prevented until the members of the clutch are synchronous and frictional means associated with the clutch members are sufficient, upon ititiation of a clutch engagement, to cause the clutch members, and all members rotating therewith, to rotate at a substantially synchronous speed of rotation.

Figure 2:
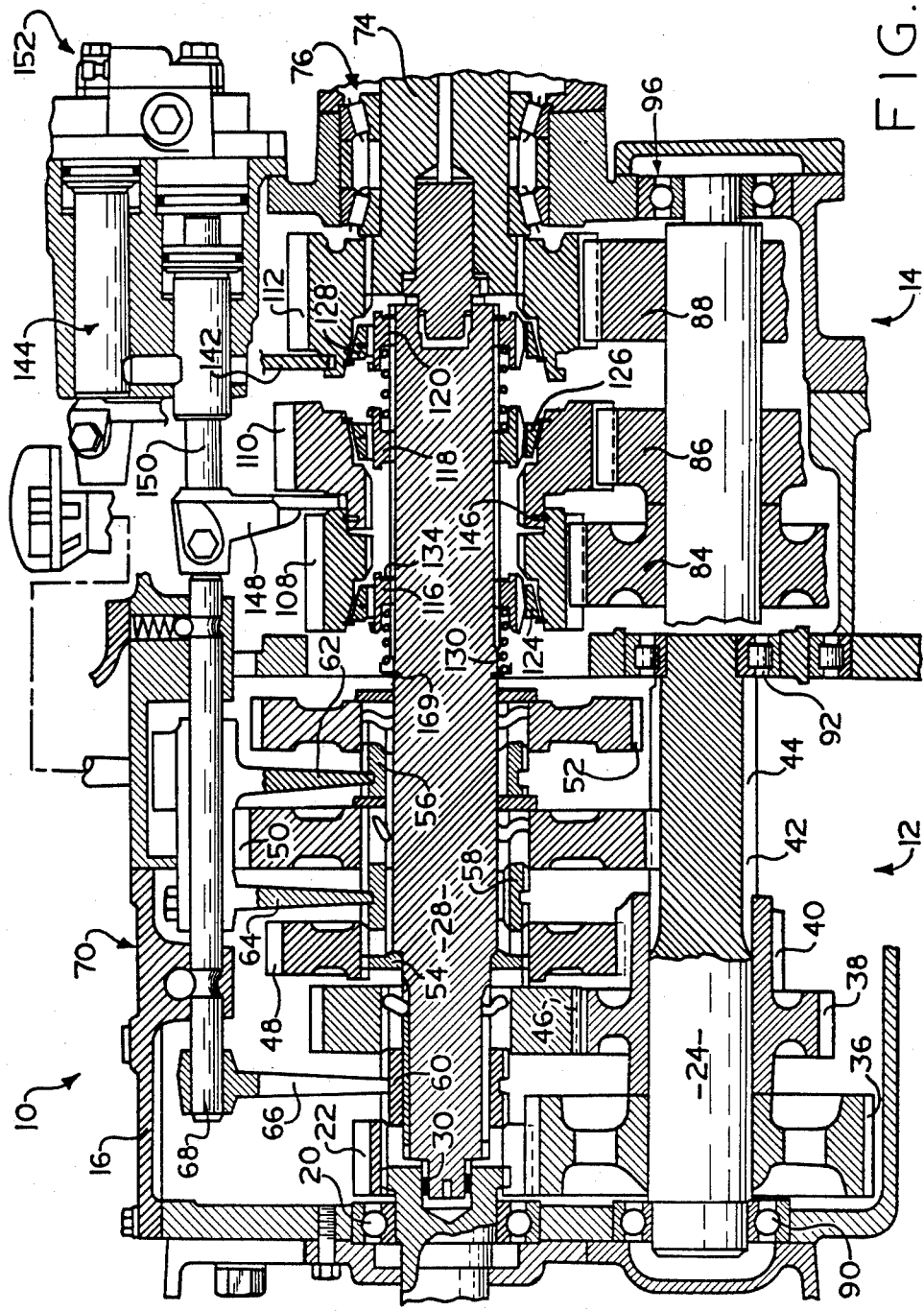
FIG. 2 is partial sectional view of the transmission on FIG. 1.

Referring now to FIGS. 1-3, there is illustrated a "4×3" twelve forward speed, semi-blocked, splitter type compound transmission 10. Transmission 10 comprises a main section 12 connected in series with an auxiliary section 14, each of which have a plurality of selectable speeds, or power paths. The main and auxiliary sections are both suitably enclosed by conventional housing means 16. While the blocked jaw clutch assemblies of the present invention are especially well suited for use in connection with semi-blocked transmissions such as illustrated transmission 10, the assemblies are also advantageously utilized with other types of transmissions.

The transmission 10 includes an input shaft 18 supported adjacent its rearward end by a bearing 20 and is provided with an input gear 22 nonrotatably connected thereto, as by splines. The input gear 22 simultaneously drives a plurality of main section countershafts at equal speeds. In the illustrated embodiment, the transmission is provided with two main section countershafts, 24 and 26, disposed on diametrically opposite sides of the mainshaft 28, which mainshaft is coaxially aligned with the input shaft 18 and is provided with a pilot portion 30 on its forward end rotatably received within and supported by the rearward end of the input shaft 18.

The input shaft 18 is normally driven in one direction only by a primemover, such as a throttle controlled Diesel engine E through a selectively operated, normally engaged, friction master clutch C. Clutch C may be selectively disengaged by use of pedal P as is known in the prior art. Clutch C may have a known clutch-brake associated therewith.

Each of the main section countershafts 24 and 26 is provided with an identical grouping of countershaft gears, such as the pair of gears 36, of identical size and number of teeth and disposed on diametrically opposite sides of the mainshaft 28. As may be seen by reference to FIG. 2, countershaft gears 42 and 44 may be defined by involute splines formed directly on the main section countershafts A plurality of main section mainshaft drive gears 46, 48, 50 and 52 surround the mainshaft 28 and are selectably clutchable thereto, one at a time, by sliding clutch collars as is well known in the art.

The main section mainshaft gears 46, 48 and 50 encircle the mainshaft 28, are in continuous meshing engagement with, and are floatingly supported by the diametrically opposite pairs of countershaft gears, 38, 40 and 42, respectively, which mounting means and the special advantages resulting therefrom are explained in greater detail in U.S. Pat. Nos. 3,105,395 and 3,335,616, the disclosures of which are hereby incorporated by reference. The mainshaft gear 52 is the reverse gear and is in continuous meshing engagement with a pair of countershaft gears 44 by means of conventional intermediate idler gears (not shown). The forwardmost countershaft gears 36 are continually meshed with and driven by the input gear 22 for causing simultaneous rotation of the countershafts 24 and 26 whenever the input shaft is rotatably driven.

Main section mainshaft gears 46, 48, 50 and 52; and main section countershaft gears 36, 38, 40, 42 and 44, and the idler gears, are all constantly meshed with and driven by the input gear 22 and thus, in combination, form the input gearing of the transmission 10.

As may be seen, various abutment rings 54 are provided to axially fix the main section mainshaft gears relative to mainshaft 28.

Sliding clutch collars 56, 58 and 60 are splined to mainshaft 28 for axial movement relative thereto and rotation therewith as is well known in the art.

Sliding clutch 56 is axially slidable by means of shift fork 62 to clutch gear 52 to the mainshaft. Sliding clutch 58 is axially slidable by means of shift fork 64 to clutch either gear 50 or 48 to the mainshaft. Sliding clutch 60 is axially slidable by means of shift fork 66 to clutch gear 46 to the mainshaft or to clutch the input gear 22 (and thus the input shaft 18) to the mainshaft. Shift forks 62, 64 and 66 are attached to shift bars or rails, (only one, 68, of which is shown) of a known shift bar housing assembly 70 which is operated by a conventional shift lever 72. The present invention is also applicable to transmissions utilizing a remote mechanical, electrical or fluid shift mechanism in place of shift bar housing 70 and shift lever 72 and also to fully or semi-automatic transmissions and transmission systems such is that illustrated in U.S. Pat. No. 4,361,060, the disclosure of which is hereby incorporated by reference.

Considering now the splitter auxiliary section 14, the mainshaft 28 extends thereinto and is coaxially arranged with and piloted into an output shaft 74 which is in turn supported within the housing 16 by suitable bearings generally indicated at 76. Said auxiliary section further includes a plurality of auxiliary section countershafts 78 and 80 each having an identical grouping of countershaft gears 84, 86 and 88 therein.

As is known in the art and is illustrated in above-mentioned U.S. Pat. No. 3,105,395, to minimize the axial and transverse dimensions of a twin countershaft type compound transmission, the mainshaft section countershafts, 24 and 26, are displaced about 90° from the auxiliary section countershafts. Main section countershafts are supported in housing 16 by bearings 90 and 92 while auxiliary section countershafts, 78 and 80, are supported in housing 16 by bearings 94 and 96.

Two auxiliary section mainshaft gears, 108 and 110, encircle the mainshaft 28 and are constantly meshed with and floatingly supported by the auxiliary countershaft gear pairs 84 and 86, respectively. Output gear 112 is splined to output shaft 74 for axial movement relative thereto and rotational movement therewith. Output gear 112 is constantly meshed with auxiliary countershaft gear pair 88.

Resiliently biased clutch members 116, 118 and 120 are splined to mainshaft 28 and, in combination with blockers (shown in FIG. 2) 124, 126 and 128, respectively, provide resilient, blocked clutching apparatus of the type described in above-mentioned U.S. Pat. Nos. 3,799,002, 3,921,469 and 3,924,484 for selectively clutching gears 108, 110 and 112, respectively, one at a time, to mainshaft 28. Clutch 116 is biased axially by spring 130 and limited in its axial movement by positive stop 134. Clutch members 118 and 120 are biased axially apart by spring 136 surrounding the mainshaft and limited in axial movement by stops 138 and 140.

Gear 112 is axially moved by shift fork 142 which is movable by shift cylinder assembly 144. Mainshaft gears 108 and 110 are joined for joint axial movement and independent rotation by ring 146 and are axially movable by shift fork 148 movable by shift cylinder assembly 150. Shift cylinder assemblies 144 and 150 define a remote servo mechanism 152 by which gears 108, 110 or 112 are selectively engaged, one at a time, to mainshaft 28. Of course, engagement of gear 112 to the mainshaft 28 is effective to couple mainshaft 28 direclty to the output shaft 74.

Control of servo mechanism 152 is preferably, by a master control means, such as selector knob 154 (see FIG. 8) attached to the gear shift lever 72. typically, master control selector knob 154 will include a movable member, such as button 156, or toggle lever, having three unique positions ("1", "2" and "3") by which one of the auxiliary section power paths, or speeds, may be selected. Typically, the auxiliary section master control 154, and the servo mechanism 152, is fluid and/or electrically operated and suitable master-slave valving and-/or circuitry is provided.

The details of the blocked, resiliently biased clutch-blocker assembly of the present invention may be seen by reference to FIGS. 4–7.

The yieldable blocked jaw clutch structures are arranged between the shiftable mainshaft gears and the auxiliary section and are provided with resilient means for urging engagement thereof as set forth in detail in the above mentioned U.S. Pat. Nos. 3,799,002; 3,924,484 and 3,983,979. While clutch means utilizing relatively nondeformable blockers of the prior art are not identical with each other, they are generally similar and hence insofar as the present invention is concerned, it will be sufficient to desribed only one of them in detail with the understanding that same may be applied to the other clutch units without difficulty by anyone skilled in the art. Therefore, for this purpose, referring to the positive jaw clutch unit positioned between the mainshaft gear 108 and the mainshaft 28 in the auxiliary transmission seciton 14, said jaw clutch unit is generally designated 156 and includes an annular clutch collar or clutch member 116 encircling the mainshaft 28. The clutch collar 116 is provided with internal splines 158 which are disposed within corresponding external splines 160 provided on the mainshaft 28 for interconnecting the clutch collar 116 to the mainshaft 28 for rotation therebetween. However, the cooperating splines 158 and 160 permit the clutch collar 116 to freely slide axially relative to the shaft 28. Other means for mounting clutch collar 116 to mainshaft 28 allowing relative axial but not rotational motion therebetween may be utilized. A stop ring 134 is seated within a suitable groove formed on the external periphery of the shaft 28 and is disposed for contacting the clutch collar 116 and limiting the rightward axial movement thereof. The collar 116 is normally resiliently urged by means of a spring 130 into a butting engagement with the stop ring 134.

The clutch collar 116 is provided with external teeth 162 thereon which are adapted to meshingly engage the internal teeth 164 provided on the mainshaft gear 108.

The internal teeth 164 form the other jaw clutch member of clutch assembly 156. The teeth 162 on the clutch collar 116 are tapered, as at 166 and in a similar manner the leading edge of the teeth 164 on the mainshaft gear 108 are similarly tapered at 168. The tapered conical surfaces each extend at an angle of preferably between 30° and 40° relative to the longitudinal axis of the mainshaft 28. The exact degree of taper, and the advantages, thereof, are explained in detail in U.S. Pat. No. 3,265,173. The other end of the spring 130 resiliently acts against a spring seat member 169 fixed to mainshaft 28.

A selected number, here three, of the teeth 162 are partially removed for permitting the presence of a blocking ring as hereinafter further described. Such partial removal leaves, however, an axially shortened or partially removed tooth 170 for cooperation with the blocking ring.

Referring now to the relatively nondeformable blockers; also called blocker rings, blocking rings and sensors; which are illustrated in FIGS. 6 and 7, one thereof is indicated generally at 124, and comprises a ring encircling the clutch member 116 and has an appropriate number, here three pairs, of radially inward projections 172 and 174, which when properly positioned will mate with the external teeth above mentioned. The inward projections or teeth 172 and 174 are contoured at their sides to lie snugly against the adjacent ones of the teeth 162, are positioned to project into the spaces between a partially removed tooth 170 and the teeth 162 on each side thereof. Each pair of projections 172 and 174 are circumferentially of less dimension than the corresponding circumferential spaces defined by partially removing teeth 170 and thus blocker ring 124 may be rotated in either a limited clockwise or counterclockwise direction relative to clutch member 116 from the position seen in FIG. 5 in which the space between teeth 172 and 174 aligns with partially removed tooth 170. Contact of either blocker tooth 172 or 174 by a clutch tooth 162 will limit such relative rotation and cause blocker 124 to rotate with clutch member 116. The space between the inwardly projecting teeth 172 and 174 is, however, of a clearance distance wider than the corresponding circumferential dimension of the tooth 170 so that when properly aligned at synchronism (or more accurately, when the relative speeds of the clutch components cross synchronism) the teeth 172 and 174 will straddle the tooth 170 and the clutch member 116 can move axially through but not past blocker ring 124 to effect engagement with its corresponding gear.

As may be seen by reference to FIGS. 6 & 7, the end faces of the blocker teeth 172 and 172 are tapered as at 176 and 178. The end face of partially removed tooth 70 is also preferably provided with tapers to ramps 180 and 182 complementary with the tapers or ramps 176 and 178 on the blocker ring blocking teeth 172 and 174. The angles 183 of the ramps 176, 178, 180 and 182 is selected such that the blocking teeth and the partially removed teeth will remain in proper blocked position when the main transmission section 12 is engaged but will tend, under a contacting force to be discussed in detail below, if an auxiliary section shift has been selected, to cause the blocker and clutch to assume a nonblocking position (by causing relative rotational movement of the clutch 116, blocker 124 and/or mainshaft 28) if the main transmission section is disengaged, i.e. in neutral. A ramp angle 183 of about 15°-25°, preferably about 20°, relative to a plane P normal to the axis of rotation of the mainshaft 28 has proven highly satisfactory for most known semi-blocked transmission structures.

As is described in greater detail by reference to above-mentioned U.S. Pat. Nos. 3,921,469 and 3,924,484, the radially inner side of ring 124 may be provided with an inwardly directed groove 184 which receives an annual resilient ring 186 which is normally of slightly less internal diameter than the external diameter of the teeth 162 so that when the parts are in the assembled condition, ring 186 is distorted slightly outwardly thereby to exert a light but definite pressure against the external surface of said teeth 162. Inasmuch as the ring 186 fits loosely and only in light frictional contact with the walls of the groove 184, this effects a significant resistance to axial movement between the blocker ring 124 and the clutch ring 116 but only an insignificant resistance to relative rotative movement therebetween.

A suitable conical surface 188 projects radially outwardly from the blocker ring 124 and is positioned for engagement with a similar conical surface 190 on a radially inner wall of the gear 108. The axial drag above mentioned is sufficient that the rotative driving effect of the surface 190 onto the blocker 124 is much greater than whatever rotative resistance may exist between the blocker 124 and the clutch member 116. A stop ring 192 limits movement of the blocker 124 away from the conical surface 190 when the clutch ring 116 moves out of engagement (leftwardly in FIG. 4).

Figure 4:
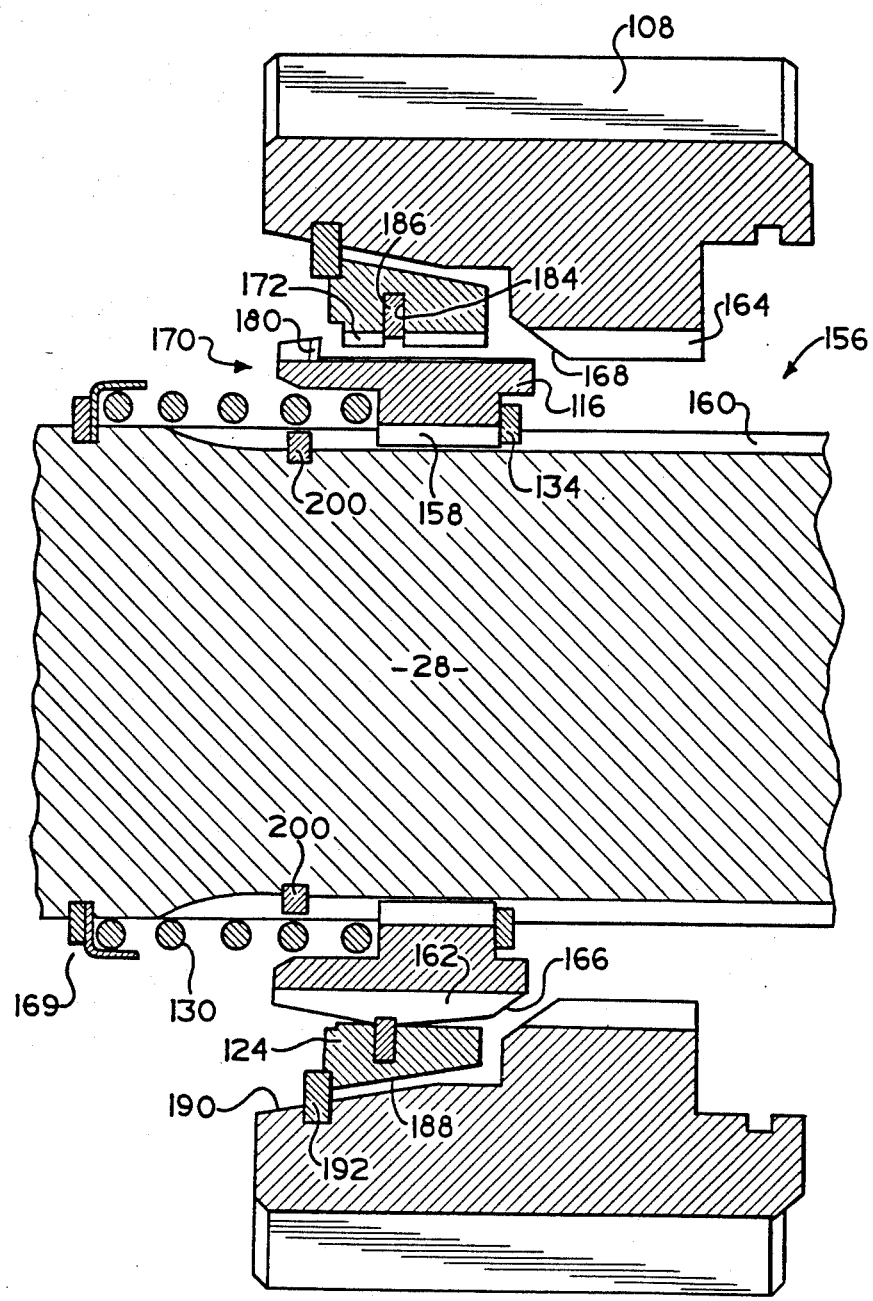
FIG. 4 is an enlarged fragmentary view, in section of one of the jaw clutch-blocker assemblies utilized in the auxiliary splitter section of the transmission of FIG. 1.

The improved blocked jaw clutch assembly of the present invention differs from the prior art in that a positive means to limit axial movement of clutch member 116 away from the previously used stop member 134 is provided. In FIG. 4, the additional means for limiting axial movement of clutch member 116 illustrated is ring 200 while in FIG. 2A an alternate embodiment comprising an axial extension 202 to clutch member 120 is illustrated. Other means to limit axial movement of the clutch members, 116, 118 or 120, may, of course, be utilized. The additional stop means is positioned or configured such that, when the blocking arrays 170, 172 and 174 are in the blocking or non-aligned position, axial movement of clutch 116, and of gear 108, actuator 150 and shift fork 14, all of which are axially fixed thereto under such conditions, will be limited or stopped at less than the full leftwardly displaced position of the actuator 150.

The operation and special advantages of the blocked clutch assembly of the present invention may be seen by comparing FIGS. 9A-9C with FIGS. 10A-10C which illustrate the structure and function of a typical prior art blocked clutch assembly 156'.

Prior art blocked clutch assembly 156' differs from assembly 156 only in that the positive stop means 200, or a functional equivalent, is not utilized. Accordingly, the details of assembly 156' will not be described in detail and like elements are assigned like reference numerals with a prime appended thereto.

Briefly, FIGS. 9A and 10A illustrate the neutral position, FIGS. 9B and 10B illustrate the pre-select position and FIGS. 9C and 10C illustrate the gear engaged position, respectively, of clutch assembly 156 and 156', respectively.

Referring first to the prior art blocked clutch assembly 156' (FIGS. 10A-10C), gear 108' is axially movable leftwardly against the bias of spring 130' by shift fork 148'. and actuator 150' comprising a cylinder 204' and piston 206'. As piston 206' is a two position device, if engagement of gear 108' to mainshaft 28' is desired, piston 206' will be fluidly urged leftwardly to the positions illustrated in FIGS. 10B and 10C.

In the preselect position, the gear 108' is moved fully into its engaged position by piston 206', which is also in its fully displaced position, and the blocking action of the arrays defined by members 107', 172' and 174', with blocker 124' in its blocking circumferential position relative to clutch member 116', will maintain clutch teeth 162' of the clutch member 116' axially separated from clutch teeth 164' in gear 108'. As the blocker 124', which tends to rotate with gear 108', is rotated relative to clutch 116' to bring the arrays into alignment by causing gear 108' and shaft 28' to cross through synchronous, the jaw clutch will become unblocked and, under the bias of compressed spring 130', fire into engagement with gear 108' as illustrated in FIG. 10C.

The drawbacks of the prior assembly 156' are that in the preselect position, FIG. 10B, the force urging the members of the arrays together (170', 172', 174',) is supplied totally by the spring 130 and, if sensor unblocking ramps are utilized, may not be of sufficient magnitude under certain circumstances. Additionally, monitoring of gear engagement, as may be necessary for a semi-automatic or fully automatic transmission system, by use of a sensor 208' sensing full leftward displacement of actuator piston 206' will provide a signal which is indicative of either preselection or of gear engagement, not of gear engagement only.

Referring now to the operation of the improved blocked jaw clutch assembly 156 of the present invention, as illustrated in FIGS. 9A-9C, it may be seen that assemblies 156 and 156' are operationally and functionally identical in both the neutral positions (FIGS. 9A and 10A) and in the gear engaged positions (FIGS. 9C and 10C). However, in the preselect position, FIG. 9B, positive stop member 200 limits the leftward axial movement of clutch member 116, blocker 124, gear 108, shift fork 148 and shift piston 206.

As discussed above, an alternate embodiment is illustrated in FIG. 2A. In FIG. 2A clutch member 120 is provided with a leftwardly extending axial extension 202 for positive contact with clutch member 118 to positively limit leftward axial movement of clutch member 120 relative to shaft 28. It is noted that extension 202 will also positively limit rightward axial movement of clutch member 118 relative to shaft 28.

The limited axial movement illustrated in FIG. 9B provides two benefits. As axial movement of clutch 116, blocker 124 and gear 108 are positively stopped by stop member 200, the force urging piston 206 leftward towards its fully displaced position may be utilized to provide additional axial force on the unblocking ramps 176, 178, 180 and 182. Also, as may be seen by reference to FIG. 9B, sensor 208 will not provide a signal of full displacement of piston 206 until an actual gear engagement has occurred.

Accordingly, by the provision of a positive stop member 200, or extension 202, positively limiting leftward axial movement of the clutch member 116, leftward axial movement of the blocker 124, gear 206 and actuator 206 to less than the full gear engaged leftward displacments thereof is also accomplished when the blocker is in the blocking position relative to the clutch. This allows actuator force to be applied to the sensor unblocking ramps and/or axial positon of the actuator to be utilized as an accurate indication of gear engagement.

Although this invention has been described in its preferred form with a certain degree of particularity, it is understood that present disclosure of the preferred form is for descriptive purposes only and that various modifications and changes in the detailed construction and arrangement of the parts may be resorted to without departing from the spirit the scope of the invention as claimed.

I claim:

1. A blocked jaw clutch assembly for coupling a gear to a shaft, said assembly comprising: first and second jaw clutch members nonrotatably associated with said gear and said shaft, respectively, said second jaw clutch member being axially slidably mounted on said shaft, and resilient means urging said second jaw clutch member in a first axial direction toward said first jaw clutch member, a nondeformable blocker ring carried by said second jaw clutch member for rotation therewith with a predetermined relative rotation therebetween, said blocker ring axially movable relative to said second jaw clutch member in at least one axial direction, said blocker ring operable to tend to rotate with said first jaw clutch member at initiation of clutch engaging operation, said blocker ring and second jaw clutch member each having projections extending therefrom defining an array of interacting projections, said array of interacting projections effective to block relative axial movement of said second clutch member toward said first clutch member if not aligned, said blocker ring having at least one rotational positon relative to said second clutch member wherein said array of projections are aligned and at least one rotational position relative to said second clutch member wherein said array of projections are not aligned, said blocker ring effective to sense nonsynchronous rotation of said clutch members corresponding to blocker ring rotation relative to said second clutch member sufficient to cause a nonalignment of said array of projections to block axial engagement of said clutch members, first stop means coacting between said second jaw clutch member and said shaft for limiting the axial movement of said second jaw clutch member in said first axial direction, said resilient means including spring means resiliently urging said second jaw clutch member against said first stop means, and shift means axially movable with said first jaw clutch member for axially shifting said first jaw clutch member in the other axial direction relative to said shaft from a first axial position wherein said first jaw clutch member is spaced from and out of engagement with said second jaw clutch member to a second axial position wherein said first jaw clutch member is fully axially displaced towards said second jaw clutch member and said jaw clutch members are axially engaged, movement of said first jaw clutch member from said first toward said second axial position while said jaw clutch members are not at synchronous rotation causing said blocker ring to contact said second jaw clutch member and axially displace same in the other axial direction in opposition to the urging of said spring means for creating a resilient clutch engaging force to cause the jaw clutch members to meshingly engage when the speeds thereof are substantially synchronized, said assembly characterized by:

second positive stop means (200,202) limiting axial movement of said second jaw clutch member in the other axial direction to a position whereat, if said arrays are not aligned, said first jaw clutch member and said shift means will be axially stopped intermediate said first and second axial positions thereof.

2. The assembly of claim 1 wherein said arrays have complementary ramps thereon which, under a force tending to bias said ramps into axial contact, will tend to cause said arrays to align.

3. The assembly of claim 2 wherein said ramps define an angle of 15°-25° with respect to a plane normal to the axis of said shaft.

4. The assembly of claim 2, wherein said ramps define an angle of about 20° with respect to a plane normal to the axis of said shaft.

5. The assembly of claim 1 wherein said first jaw clutch member is axially fixed to said gear.

6. The assembly of claim 2 wherein said first jaw clutch member is axially fixed to said gear.

7. The assembly of claim 1 wherein said second positive stop means comprises a ring axially fixed to said shaft.

8. The assembly of claim 2 wherein said second positive stop means comprises a ring axially fixed to said shaft.

9. The assembly of claim 6 wherein said second positive stop means comprises a ring axially fixed to said shaft.

10. The assembly of claim 1 wherein said second positive stop means is axially fixed to said second jaw clutch member.

11. The assembly of claim 2 wherein said second positive stop means is axially fixed to said second jaw clutch member.

12. The assembly of claim 6 wherein said second positive stop means is axially fixed to said second jaw clutch member.

13. A semi-blocked splitter type copound transmission comprising: an input component comprising an input shaft, and input gear rotationally fixed to said input shaft, at least one first countershaft carrying a plurality of first countershaft gears constantly meshed with said input gear and a plurality of first mainshaft gears constantly meshed with other of said first countershaft gears;

a connecting component comprising a mainshaft and a plurality of first and second mainshaft clutch members rotationally fixed to said mainshaft, said connecting component independently rotatable of said input component; and an output component comprising an output shaft, an output gear rotationally fixed to said output shaft, at least one second countershaft carrying a plurality of second countershaft gears thereon, one of said second countershaft gears constantly meshed with said output gear and at least one second mainshaft gear constantly meshed with another of said second countershaft gears, said output component independently rotatable of said connecting component.

said input gear and first mainshaft gears selectively clutchable one at a time to said mainshaft by nonblocked nonsynchronized clutch means, said output gear and second mainshaft gear selectively clutchable one at a time to said mainshaft by blocked jaw clutch assemblies each comprising a first and second jaw clutch member nonrotatably associated with one of said output and second mainshaft gears; and said mainshaft, respectively, said second jaw clutch member being axially slidably mounted on said mainshaft, and resilient means urging said second jaw clutch member in a direction toward said first jaw clutch member, a nondeformable blocker ring carried by said second jaw clutch member for rotation therewith with a predetermined relative rotation therebetween, said blocker ring axially movable relative to said second jaw clutch member in at least one axial direction, said blocker ring operable to tend to rotate with said first jaw clutch member at initiation of clutch engaging operation, said blocker ring and second jaw clutch member each having projections extending therefrom defining an array of interacting projections, said array of interacting projections effective to block relative axial movement of said second clutch member toward said first clutch member if not aligned, said blocker ring having at least one rotational position relative to said second clutch member wherein said array of projections are aligned and at least one rotational position relative to said second clutch member wherein said array of projections are not aligned, said blocker ring effective to sense nonsynchronous rotation of said clutch members corresponding to blocker ring rotation relative to said second clutch member sufficient to cause a nonalignment of said array of projections to block axial engagement of said clutch members, first stop means coacting between said second jaw clutch member and said mainshaft for limiting the axial movement of said second jaw clutch member toward said first jaw clutch member, said resilient means including spring means resiliently urging said second jaw clutch member against said first stop means, and shift means for axially shifting said first jaw clutch member relative to said mainshaft from a first axial position wherein said first jaw clutch member is spaced from and out of engagement with said second jaw clutch member to a second axial position relative to said mainshaft wherein said first jaw clutch member is fully axially displaced towards said second jaw clutch member and said jaw clutch members are axially engaged, movement of said first jaw clutch member from said first to said second axial position while said jaw clutch members are not at synchronous rotation causing said blocker ring to contact said second jaw clutch member and axially displace same in opposition to the urging of said spring means for creating a resilient clutch engaging force to cause the jaw clutch members to meshingly engage when the speeds thereof are substantially synchronized, said arrays have complementary ramps thereon which, under a force tending to bias said ramps into axial contact, will tend to cause said arrays to align, said transmission characterized by:

said blocked jaw clutch assemblies including second positive stop means (200, 202) limiting axial movement of said second jaw clutch members in the axial direction away from said first stop means to a position whereat, if said arrays are not aligned, said first jaw clutch members and said shift means will be axially stopped intermediate said first and second axial positions thereof.

14. The transmission of claim 13 wherein said ramps define an angle of 15°-25° with respect to a plane normal to the axis of said shaft.

15. The transmission of claim 13 wherein said first jaw clutch members are axially fixed to said output gear and auxiliary mainshaft gear.

16. The transmission of claim 14 wherein said first jaw clutch members are axially fixed to said output gear and second mainshaft gear.

17. The transmission of claim 13 wherein said second positive stop means comprises a ring axially fixed to said mainshaft.

18. The transmission of claim 15 wherein said second positive stop means comprises a ring axially fixed to said mainshaft.

19. The transmission of claim 13 wherein said second positive stop means is axially fixed to one of said second jaw clutch members.

20. The transmission of claim 15 wherein said second positive stop means is axially fixed to one of said second jaw clutch members.

* * * * *